March 22, 1932. H. E. KELLOGG 1,850,552
STOPPING AND STARTING ATTACHMENT
Filed Jan. 13, 1927
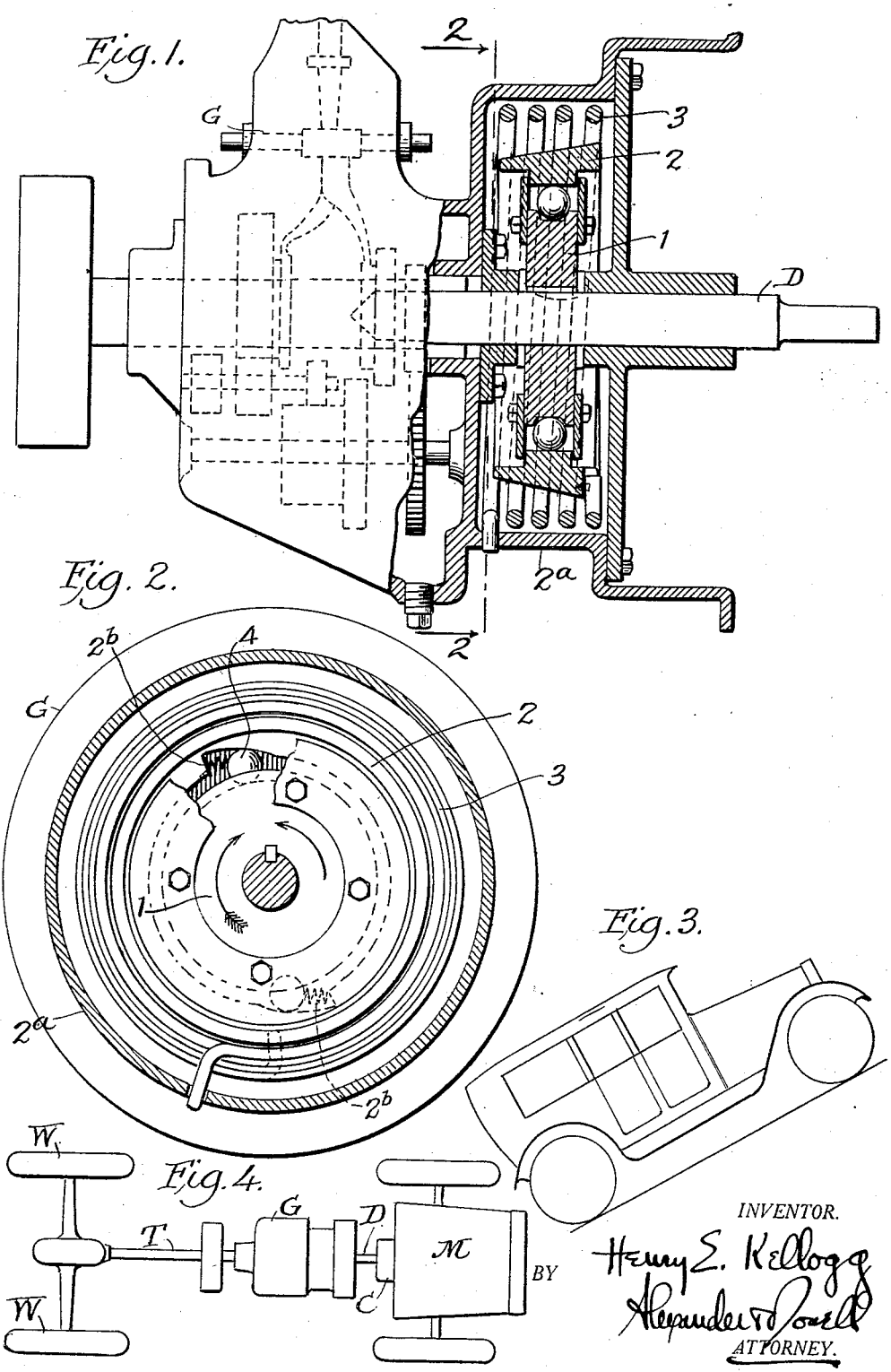

Patented Mar. 22, 1932

1,850,552

UNITED STATES PATENT OFFICE

HENRY E. KELLOGG, OF BATTLE CREEK, MICHIGAN

STOPPING AND STARTING ATTACHMENT

Application filed January 13, 1927. Serial No. 160,951.

This invention relates to motor driven vehicles and has particular reference to automobiles, trucks, and the like.

The object of the invention is to provide means to facilitate the starting of a car on an upgrade. Great difficulty is experienced by drivers of motor cars, particularly with engines having a small number of cylinders, and especially where the drivers are not expert, in starting a car on an upgrade when for any reason it is necessary to stop the car on account of traffic or other cause. Ordinarily, when the car is stopped it is necessary to accelerate the motor, release the brake, and shift the gear into "low". Unless this is done properly it is apt to kill the engine and frequently when the brake is released and before the gear is shifted into low the car starts backward. This sometimes causes serious accidents. Stopping of the engine necessitates the repetition of the whole series of starting operations—plus the additional operation of actuating the starter or cranking the engine. Some very serious accidents have resulted from this cause. The object of the present invention is to provide the car with means and mechanism whereby the car can be stopped on a upgrade and the brake released permitting the car to roll back by gravity, this gravitational action of the car being utilized to store up energy in springs, or the like, and stop and hold the car on the grade and also assist in starting it forward, relieving the operator of the necessity of holding the car on the grade by a brake during the starting operation.

The invention is capable of various mechanical embodiments, and in the accompanying drawings I have illustrated one practical mechanism embodying the invention, and the following description will enable others to more thoroughly comprehend and understand the invention; and I will explain the same with reference to said drawings and refer to the claims for summaries of the essentials of the invention and novel features of construction and combinations of parts for which protection is desired.

In said drawings,—

Figure 1 is a detail view partly in section of one form of mechanism embodying the invention;

Fig. 2 is a transverse sectional view on the line 2—2, Fig. 1;

Fig. 3 is a diagrammatic view of a motor car on a grade.

Fig. 4 is a diagrammatic view of a motor car drive system.

Referring to Fig. 4 of the drawings, the drive shaft D is operated from the engine or motor M by the usual "clutch" C, and in the gear case G is housed the variable drive gearing which may be of any suitable construction and being well-known it is not necessary to illustrate or describe same herein in detail; and the transmission shaft T is driven from the drive shaft D through the variable drive gearing and drives through the rear axle the drive wheels W of the vehicle. All these parts being well-known need no particular or detailed illustration or description herein; and all may be of any desired construction.

Of course the drive shaft D runs continuously and in one direction when clutched to the engine shaft, but the transmission shaft T will be driven at different speeds and in different directions according to the adjustment of the gears in the case G.

In the specific embodiment of the invention illustrated in the drawings, upon the drive shaft D is keyed a member or disk 1. Surrounding the disk is an annulus 2 which is rotatably but not longitudinally movable on the disk 1.

Suitable clutch devices are provided to automatically lock the annulus 2 to the disk 1 when the disk moves anti-clockwise, and to free the annulus from the disk when the construction moves clock-wise. In the construction shown I have illustrated ball rollers and clutches 4 arranged in suitable cam pockets 2b between the peripheries of the annulus and the disk. The annulus 2, however, is further held against rotation by spring means, a coiled spring 3 being shown in the drawings; one end of this spring being attached to the annulus and the other end being attached to the fixed portion of the gear casing G or a part 2a of the gear housing G in which the risk 1, annulus 2, and spring 3 may be housed as shown in Fig. 1.

When the clutch is de-clutched but the variable gear is engaged then the shaft D would be turned according to the direction of movement of the vehicle, if it is moving at all. If the vehicle is stopped upon an incline as in Fig. 3, it would move backward by gravity and if the gear is engaged shaft D would also be turned backward or reversed from the direction in which it is normally operated when the vehicle is going forward. When the vehicle is going forward the disk 1 rotates idly within the annulus 2. If the clutch is thrown out and the vehicle moves backward by gravity shaft D, if engaged in "forward" gear, will be turned backward due to the gravitational movement of the vehicle, and disk 1 will be reversed and moved in the direction indicated by the tailed arrow in Fig. 2.

In this construction it will be seen that if the car is stopped on a hill or incline as indicated in Fig. 3, the clutch released, and the gear left in or adjusted into "forward" position, the brake being released, the car will start to coast backward by gravity, but this backward movement will be resisted and arrested by the energy storing means, such as spring 3, which should be very stout. The energy storing means, or spring, will accumulate or store up energy until its resistance arrests the gravitational movement of the car. The energy storing device will then hold the car against gravity.

Then to start the car all that the operator has to do is to accelerate the motor and engage the clutch, and the car would start as if on a level, the accumulated energy stored in the spring or energy storing device assisting the engine in starting the car forward.

The great practical advantage of this construction is that the operator is as free to use his hands and feet as if the car were started on the level, and is not compelled to make very quick changes of hands either from one lever to another or of his foot from brake to accelerator. This invention will relieve the operator from nervous strains and necessity for quick thinking and acting in starting the car on an uphill incline, which is sometimes particularly trying to a nervous or slow thinking operator; the invention not only enhances the ease of starting but greatly increases safety, and also facilitates movement of the traffic, in that the engine will not be killed in starting, and consequent re-cranking or use of re-starter is obviated.

It will be seen that this device provides effective means for holding a motor vehicle in a stopped position on an upgrade without the use of either hand or foot brakes. It obviates the present practice of starting the vehicle so stopped against resistance of both brakes and grade. It provides a stop device for use on upgrade which does not in any way resist forward movement of the vehicle. It makes stopping on upgrade both safe and convenient for any driver. It eliminates the present excessive strain and wear on driving mechanisms. It makes easy and safe what is now the most difficult and dangerous thing an operator is called upon to do with a motor vehicle and prevents reverse movement of engine when cranking by hand when both vehicle and engine are in normal stopped positions.

Operation

In making a stop upgrade the driver should apply either hand or foot brake and disengage and hold the clutch in the disengaged position, then select and engage the gear to be used on the next forward movement, then release the brakes (still holding the clutch in the disengaged position) thus allowing the vehicle to rest against the resistance to reverse movement of the clutch driven shaft.

In starting from this position the operator should have the right foot in contact with the accelerator and control the engine to proper starting speed, then allow the clutch to engage slowly. Nothing else is required, thus leaving both hands free to steer and signal as may be necessary.

This device in its normal idling position prevents reverse movement of the engine when cranking by hand, thereby making safe a very dangerous operation which it is often necessary to perform.

I claim:

1. In combination with a vehicle having a driven shaft, a transmission shaft, clutch means for connecting and disconnecting said driven shaft from the engine, and variable gearing between the driven shaft and the transmission shaft; of a disk on the driven shaft, an annulus surrounding the disk and clutch devices between the disk and annulus operatively engaged only when the driven shaft is reversed whereby the backward movement of the vehicle by gravity is arrested when the clutch means is de-clutched.

2. In combination with a vehicle having a driven shaft, a transmission shaft, and clutch means for connecting and disconnecting said driven shaft; of power storing means operated by said driven shaft only when the clutch is de-clutched and the vehicle moves backward by gravity, said storing means being adapted to arrest the backward gravitational movement of the vehicle and assist in the next forward movement of the vehicle.

3. In combination with a vehicle having a driven shaft, of spring means for storing energy, means adapted to automatically compress the energy storing means upon the backward movement of the vehicle by gravity when the clutch is de-clutched and to assist in the forward movement of the vehicle when it is again started.

4. In combination with a vehicle having a driven shaft, a transmission shaft, clutch means for connecting and disconnecting said driven shaft from the engine, and variable gearing between the driven shaft and the transmission shaft; of power storing means operated by said driven shaft only when the clutch is de-clutched and the vehicle moves backward by gravity, said storing means being adapted to arrest the backward gravitational movement of the vehicle and assist in the next forward movement of the vehicle.

5. In combination with a vehicle having a driven shaft, a transmission shaft, clutch means for connecting and disconnecting said driven shaft from the engine, and variable gearing between the driven shaft and transmission shaft; of means for storing energy, means adapted to automatically operate the energy storing means upon the backward movement of the vehicle by gravity when the clutch is de-clutched and to assist in the forward movement of the vehicle when it is again started.

6. In combination with a vehicle having a driven shaft, a transmission shaft, clutch means for connecting and disconnecting said driven shaft from the engine, and variable gearing between the driven shaft and the transmission shaft; of power storing means, clutch-devices for operating said power storing means by said driven shaft only when the clutch is de-clutched and the vehicle moves backward by gravity; said storing means being adapted to arrest backward movement of the vehicle by gravity when the clutch is de-clutched and to assist the next forward movement of the vehicle.

7. In combination with a vehicle having a driven shaft, a transmission shaft, clutch means for connecting and disconnecting said driven shaft, of a member fixed on the driven shaft, a second member, clutch devices between the members operatively engaged only when the driven shaft is re-reversed; and energy storing spring means operated by the second member, said storing means being adapted to arrest the backward movement of the vehicle by gravity when the clutch is de-clutched and to assist the next forward movement of the vehicle.

8. In combination with a vehicle having a driven shaft, a transmission shaft, clutch means for connecting and disconnecting said driven shaft from the engine, of a disk fixed on the driven shaft, an annulus surrounding the disk, clutch devices between the disk and annulus operatively engaged only when the driven shaft is reversed; and energy storing springs operated by the annulus and adapted to arrest the backward movement of the vehicle by gravity when the clutch means is de-clutched, and to assist the next forward movement of the vehicle.

9. In combination with a vehicle having a driven shaft, a transmission shaft, clutch means for connecting and disconnecting said driven shaft from the engine, and variable gearing between the driven shaft and the transmission shaft; of a disk fixed on the driven shaft, an annulus surrounding the disk, clutch devices between the disk and annulus operatively engaged only when the driven shaft is reversed; and a coiled spring surrounding the annulus and having engagement therewith adapted to store up energy and arrest the backward movement of the vehicle by gravity when the clutch means is de-clutched, and to assist the next forward movement of the vehicle.

10. In a device of the character described, a pair of movable members, a resilient resistance operated by one of the members adapted to arrest movement of said member in one direction, and means for connecting the two members for operation.

11. In a device of the character specified, a drive member, a driven member, a connecting means adapted to move the two members in unison, and a resilient resistance operated by the driven member, adapted to arrest movement of the connected members, and return the driven member to its idling position.

12. In combination with a vehicle having a driven shaft and means for connecting and disconnecting said driven shaft, of a device operated by said shaft adapted to arrest gravitational movement of the vehicle in one direction, and assist driven movement in the other direction.

13. In combination with a vehicle having a motor and wheels with driving devices extending from said motor to said wheels of a device operated by movement of said vehicle adapted to arrest vehicle movement in one direction, and assist such movement in the reverse direction.

14. In combination with a motor vehicle having a clutch shaft and means for driving said shaft in one direction; of means operated by the reverse movement of said shaft, and when so operated being adapted to arrest such movement and assist in the initial driven movement of said shaft.

15. In combination with a vehicle having wheels, a motor, and means for transmitting power from the motor to the wheels; of means operated by and adapted to arrest rearward undriven movement of said vehicle and to also assist in the initial forward movement thereof.

16. In combination with a vehicle having traction wheels with power transmitting devices extending from the source of power to said wheels; of a device operated by and adapted to arrest gravitational or undriven movement of said vehicle, and to assist initial driven movement of said vehicle.

17. In combination with a wheeled vehicle having a motor and means for transmitting power from said motor to the wheels of the vehicle, of means operated by gravitational or undriven movement of said vehicle, and adapted to arrest such movement of the vehicle, and to assist in starting the same on the forward movement thereof.

In testimony that I claim the foregoing as my own, I affix my signature.

HENRY E. KELLOGG.